US011936136B2

(12) United States Patent
Iida

(10) Patent No.: US 11,936,136 B2
(45) Date of Patent: Mar. 19, 2024

(54) CONNECTOR AND CONNECTOR DEVICE

(71) Applicant: SUMITOMO WIRING SYSTEMS, LTD., Mie (JP)

(72) Inventor: Koji Iida, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 162 days.

(21) Appl. No.: 17/560,733

(22) Filed: Dec. 23, 2021

(65) Prior Publication Data

US 2022/0224046 A1 Jul. 14, 2022

(30) Foreign Application Priority Data

Jan. 8, 2021 (JP) ................................ 2021-001806

(51) Int. Cl.
*H01R 13/627* (2006.01)
*H01R 13/436* (2006.01)

(52) U.S. Cl.
CPC ..... *H01R 13/6272* (2013.01); *H01R 13/4364* (2013.01)

(58) Field of Classification Search
CPC ............ H01R 13/6272; H01R 13/4364; H01R 12/716; H01R 13/6335; H01R 13/639; H01R 24/00
See application file for complete search history.

(56) References Cited

U.S. PATENT DOCUMENTS

| | | | | |
|---|---|---|---|---|
| 5,638,474 | A * | 6/1997 | Lampert | G02B 6/3893 385/136 |
| 5,984,705 | A * | 11/1999 | Miyazaki | H01R 13/703 340/687 |
| 6,116,938 | A * | 9/2000 | Myer | H01R 13/6272 439/271 |
| 6,364,683 | B1 * | 4/2002 | Kohno | H01R 13/639 439/352 |
| 6,491,542 | B1 * | 12/2002 | Zerebilov | H01R 13/639 439/352 |
| 6,712,635 | B1 * | 3/2004 | Nimura | H01R 13/641 439/352 |
| 8,221,007 | B2 * | 7/2012 | Peterhans | G02B 6/3893 385/60 |
| 9,941,631 | B1 * | 4/2018 | Taira | H01R 13/502 |
| 10,855,028 | B1 * | 12/2020 | Henry | H01R 13/6272 |
| 2004/0192099 | A1 * | 9/2004 | Seminara | H01R 13/639 439/352 |
| 2006/0134964 | A1 | 6/2006 | Ohtaka et al. | |
| 2008/0081511 | A1 * | 4/2008 | Lloyd | H01R 13/6335 439/552 |

(Continued)

FOREIGN PATENT DOCUMENTS

JP H03-030270 A 2/1991

*Primary Examiner* — Abdullah A Riyami
*Assistant Examiner* — Nelson R. Burgos-Guntin
(74) *Attorney, Agent, or Firm* — Venjuris, P.C.

(57) ABSTRACT

A connector includes a housing body, a lock arm and a sub lock portion. The lock arm and the sub lock portion lock a mating housing to hold the housing body and the mating housing in a connected state. The lock arm is shaped to project from the housing body and be deflectable and deformable. The sub lock portion is arranged at a position facing the lock arm in a deflecting direction of the lock arm in the housing body.

5 Claims, 7 Drawing Sheets

(56) References Cited

U.S. PATENT DOCUMENTS

| | | | | |
|---|---|---|---|---|
| 2015/0079827 | A1* | 3/2015 | Hara | H01R 13/05 439/188 |
| 2017/0054244 | A1* | 2/2017 | Caldwell | H01R 13/641 |
| 2018/0083385 | A1* | 3/2018 | Akagi | H01R 13/62938 |
| 2019/0027864 | A1* | 1/2019 | Hamada | H01R 13/62938 |
| 2019/0103705 | A1 | 4/2019 | Amemiya et al. | |
| 2020/0059042 | A1* | 2/2020 | Chen | H01R 13/502 |
| 2020/0321727 | A1* | 10/2020 | Li | H01R 13/6275 |
| 2022/0278488 | A1* | 9/2022 | Miyamura | H01R 13/42 |

* cited by examiner

CONNECTOR AND CONNECTOR DEVICE

CROSS-REFERENCE TO RELATED APPLICATIONS

This application is based on and claims priority from Japanese Patent Application No. 2021-001806, filed on Jan. 8, 2021, with the Japan Patent Office, the disclosure of which is incorporated herein in their entireties by reference.

TECHNICAL FIELD

The present disclosure relates to a connector and a connector device.

BACKGROUND

A connector disclosed in Japanese Patent Laid-open Publication No. H03-030270 includes a first housing and a second housing connectable to each other. The first housing includes a pair of left and right latch arms (first arm, second arm) and a third arm arranged between the respective latch arms. Each latch arm is deflectable and deformable in lateral directions, which are directions toward and away from the third arm. The third arm is deflectable and deformable in a vertical direction. The respective latch arms and the third arm are locked to the second housing. In this way, the first and second housings are held in a connected state. A connector having a plurality of such locking structures is also disclosed in Japanese Patent Laid-open Publication No. 2006-179265. See, for example, Japanese Patent Laid-open Publication No. 2019-067744.

SUMMARY

In the case of Japanese Patent Laid-open Publication No. H03-030270, spaces for arranging the respective latch arms are necessary on both left and right sides of the third arm. Thus, there is a concern that the connector is enlarged as a whole. Since the plurality of locking structures are provided side by side in the lateral direction in Japanese Patent Laid-open Publication No. 2006-179265 as in Japanese Patent Laid-open Publication No. H03-030270, there is a problem that the connector tends to be enlarged.

Accordingly, the present disclosure aims to avoid the enlargement of a connector.

The present disclosure is directed to a connector with a housing body, a lock arm and a sub lock portion, wherein the lock arm and the sub lock portion lock a mating housing to hold the housing body and the mating housing in a connected state, the lock arm is shaped to project from the housing body and be deflectable and deformable, and the sub lock portion is arranged at a position facing the lock arm in a deflecting direction of the lock arm in the housing body.

According to a connector and a connector device of the present disclosure, it is possible to avoid the enlargement of the connector.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
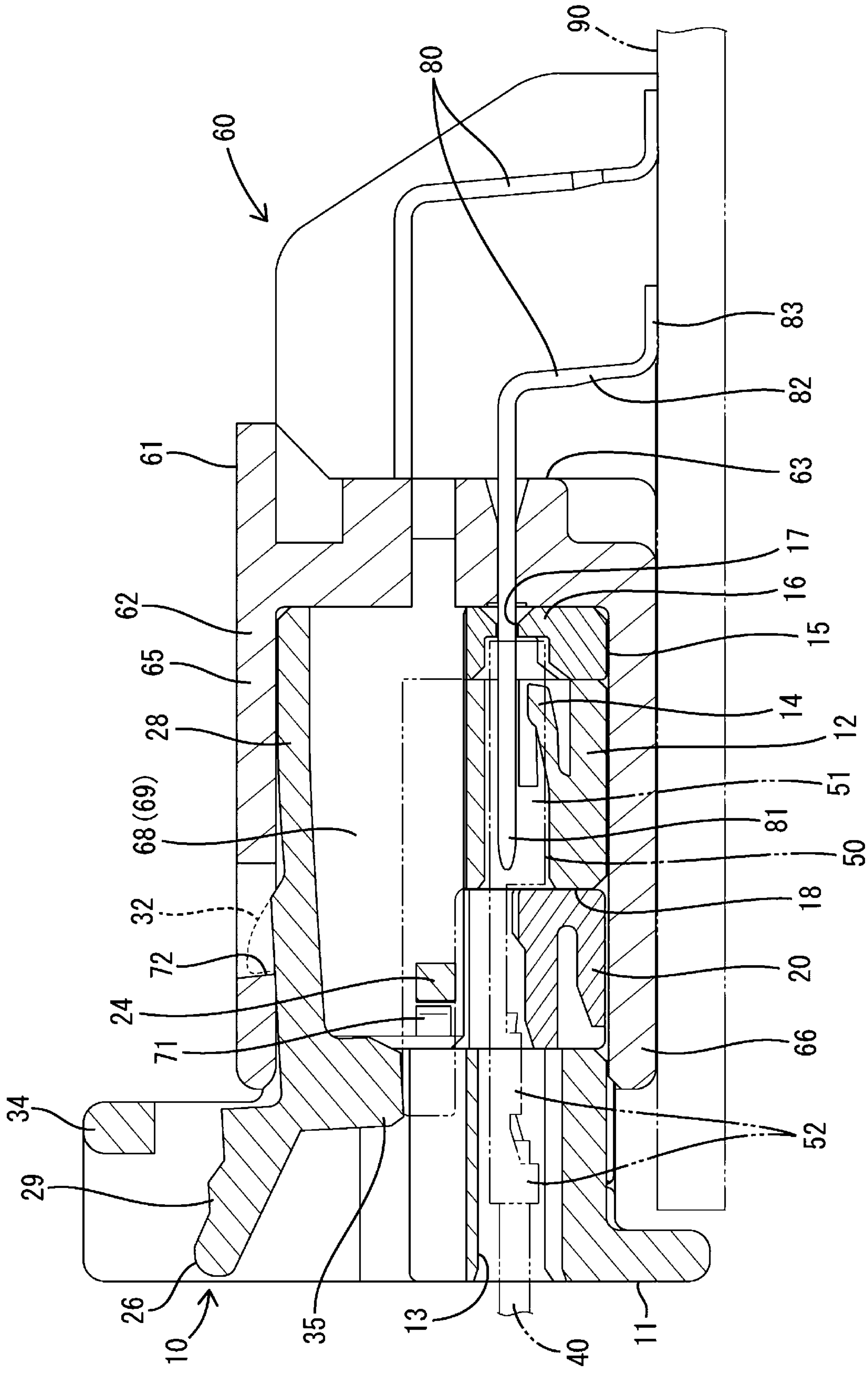
FIG. 1 is a section showing a state where a housing and a mating housing are properly connected in a connector device of an embodiment.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Description of Embodiments of Present Disclosure

First, embodiments of the present disclosure are listed and described.

(1) The connector of the present disclosure includes a housing body, a lock arm and a sub lock portion, wherein the lock arm and the sub lock portion lock a mating housing to hold the housing body and the mating housing in a connected state, the lock arm is shaped to project from the housing body and be deflectable and deformable, and the sub lock portion is arranged at a position facing the lock arm in a deflecting direction of the lock arm in the housing body.

According to the above configuration, since double locking by the lock arm and the sub lock portion can be applied to the mating housing, the connected state of the housing body and the mating housing can be satisfactorily held. Further, since a space in the deflecting direction of the lock arm is effectively utilized as an installation space for the sub lock portion, space saving can be realized and the enlargement of the connector can be avoided.

(2) Preferably, the lock arm includes a releasing portion projecting in the deflecting direction and configured to release locking of the sub lock portion to the mating housing.

According to the above configuration, the lock arm is deflected and deformed, whereby the locking of the sub lock portion to the mating housing can be automatically released. Thus, a special operation of releasing the locking of the sub lock portion to the mating housing needs not be performed and releasing workability is excellent.

(3) The sub lock portion may be shaped to be deflectable and deformable in a direction intersecting the deflecting direction of the lock arm.

According to the above configuration, it is possible to avoid the enlargement of the housing body in the deflecting direction of the lock arm due to the presence of the sub lock portion.

(4) At least one of the releasing portion and the sub lock portion may have a cam surface inclined in a direction intersecting the deflecting direction of the lock arm and configured to contact the other of the releasing portion and the sub lock portion.

According to the above configuration, the lock arm is deflected and deformed and the releasing portion contacts the sub lock portion, whereby the sub lock portion can be easily deflected and deformed in the direction intersecting the deflecting direction of the lock arm by the inclination of the cam surface.

(5) The housing body may include an opening open in a rear surface on a side opposite to a side facing the mating housing and enabling visual confirmation of a locked state of the sub lock portion to the mating housing.

According to the above configuration, even if the sub lock portion is arranged at a back side position inside the housing body, the locked state of the sub lock portion to the mating housing can be confirmed through the opening.

(6) Further, a connector device of the present disclosure includes the connector of any one of (1) to (5) described above, and a mating connector including the mating housing, wherein the mating housing includes a lock receiving portion to be locked to the lock arm, a sub lock receiving portion to be locked to the sub lock portion and a receptacle into which a plurality of mating terminals project, and the lock receiving portion is shaped to penetrate through or be recessed in a peripheral wall of the receptacle.

According to the above configuration, since the lock receiving portion is within a thickness range of the peripheral wall of the receptacle, it is possible to avoid the enlargement of the receptacle due to the presence of the lock receiving portion.

In contrast, if the thickness of the peripheral wall of the receptacle cannot be increased due to a request for size reduction, a formation range of the lock receiving portion becomes smaller and it becomes difficult to ensure locking strength of the lock receiving portion to the lock arm. In that sense, according to the present disclosure, the locking of the sub lock portion and the sub lock receiving portion is realized in addition to the locking of the lock arm and the lock receiving portion. Thus, the connected state of the housing body and the mating housing can be satisfactorily held.

(7) The mating housing may include a protrusion projecting into the receptacle and arranged between the plurality of mating terminals, and the sub lock receiving portion may be provided on the protrusion.

According to the above configuration, the protrusion is provided between the plurality of mating terminals with good space efficiency in the receptacle. Since the sub lock receiving portion is provided on this protrusion, it is possible to avoid the enlargement of the receptacle due to the presence of the sub lock receiving portion.

Details of Embodiments of Present Disclosure

A specific example of the present disclosure is described below with reference to the drawings. Note that the present invention is not limited to this illustration and is intended to be represented by claims and include all changes in the scope of claims and in the meaning and scope of equivalents.

A connector device of this embodiment includes a connector 10 and a mating connector 60 as shown in FIG. 1. The connector 10 is a female connector and includes a housing 11 and female terminals 50. The mating connector 60 is a male connector and includes a mating housing 61 and male mating terminals 80. This mating connector 60 is a board connector to be mounted on a circuit board 90. The housing 11 and the mating housing 61 are connectable to each other. Note that, in the following description, surface sides facing each other when the connection of the housing 11 and the mating housing 61 is started are referred to as front sides concerning a front-rear direction. A vertical direction is synonymous with a height direction and based on a vertical direction of FIG. 1. A lateral direction is synonymous with a width direction and based on a lateral direction of FIGS. 2 to 5 and 7. These direction references do not necessarily coincide with directions during use.

<Mating Housing>

Figure 2:
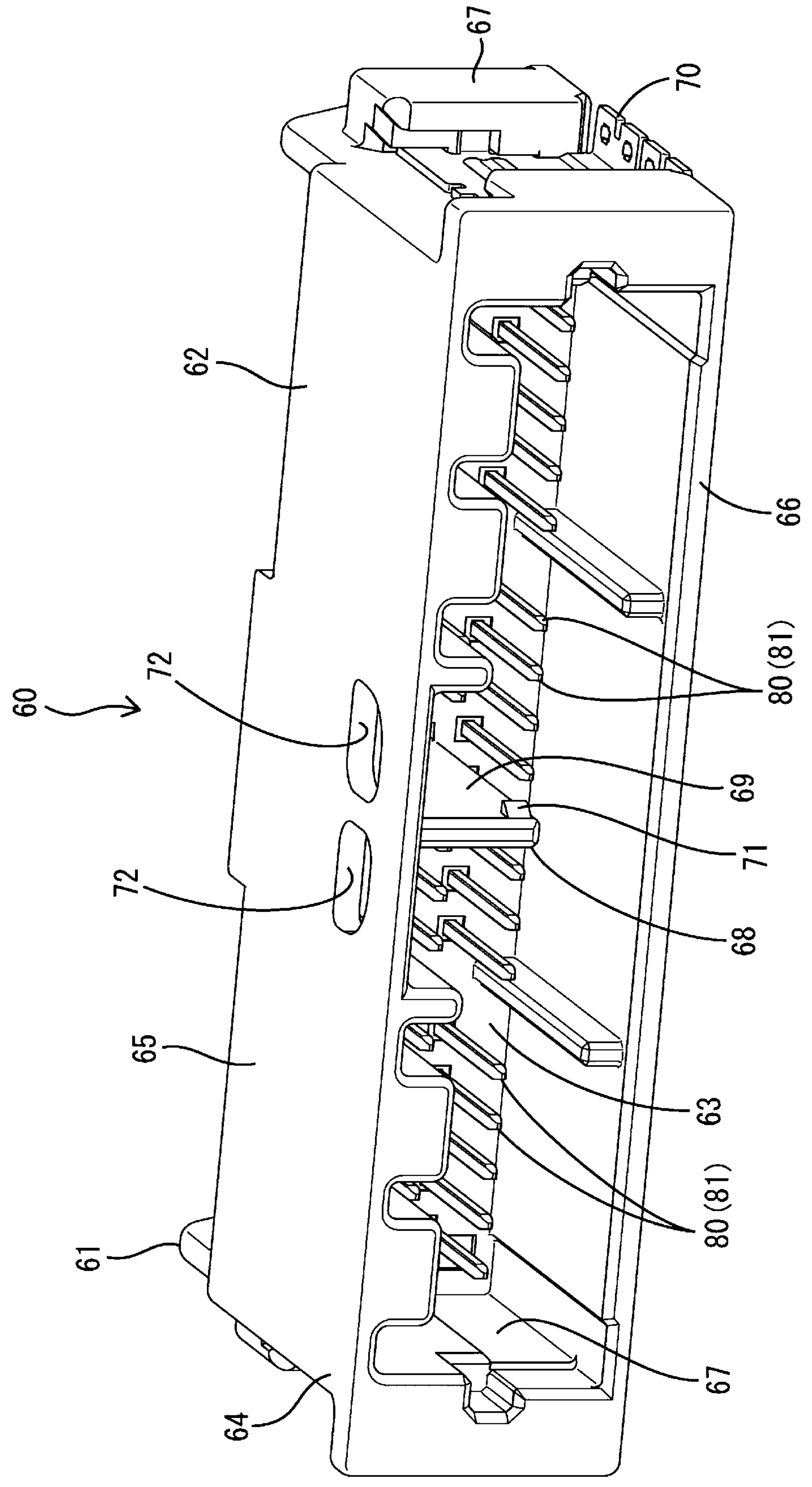
FIG. 2 is a perspective view of a mating connector viewed from front.

The mating housing 61 is made of synthetic resin and, as shown in FIG. 1, disposed on a surface of the circuit board 90. As shown in FIG. 2, the mating housing 61 includes a receptacle 62 in the form of a rectangular tube long in the lateral direction. The receptacle 62 includes a back wall 63 and a peripheral wall 64 projecting forward from the back wall 63. The peripheral wall 64 is composed of an upper wall 65, a lower wall 66 and left and right side walls 67. Due to a request for height reduction, the upper and lower walls 65, 66 are respectively formed to be thinner than the respective side walls 67. Fixing members 70 made of metal are mounted in the respective side walls 67. The fixing members 70 are soldered to the surface of the circuit board 90. The mating housing 61 is fixed to the circuit board 90 via the fixing members 70.

The upper surface of the upper wall 65 and the lower surface of the lower wall 66 are formed to be flat as a whole. The upper wall 65 includes a pair of left and right lock receiving portions 72 on a widthwise central side. Each lock receiving portion 72 is in the form of a hole penetrating through the upper wall 66 in a thickness direction (vertical direction).

Figure 6:
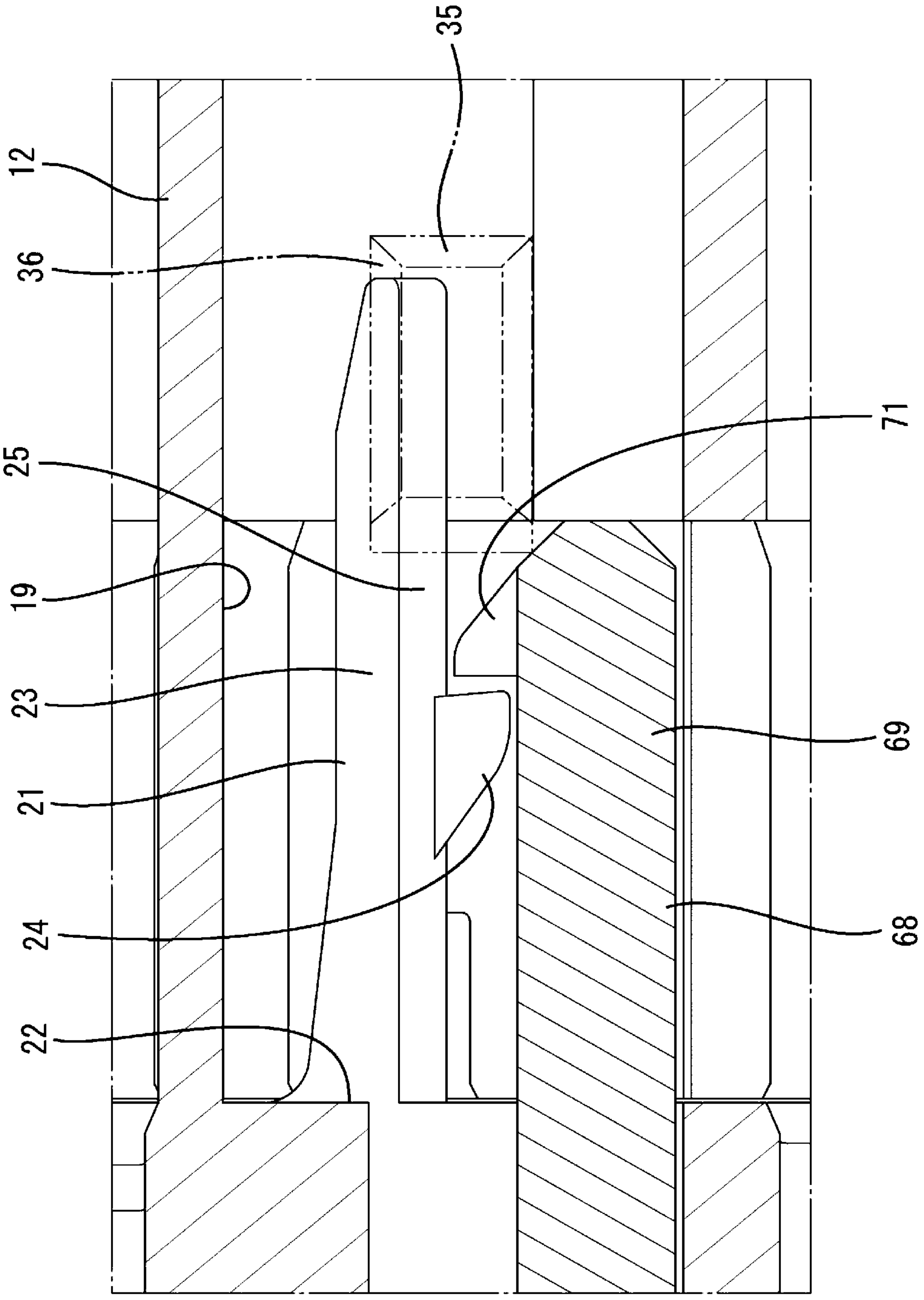
FIG. 6 is a partial enlarged view partly in section viewed from the side of a lock arm showing the locked state of the sub lock portion and the sub lock receiving portion with the housing and the mating housing properly connected.

Further, the receptacle 62 includes a protrusion 68 projecting downward (into the receptacle 62) from the lower surface of the upper wall 65. The protrusion 68 includes a plate-like protrusion body 69. Left and right plate surfaces of the protrusion body 69 are facing in the lateral direction and arranged along the vertical direction and front-rear direction. The protrusion 68 includes a sub lock receiving portion 71 projecting from a front end lower part of the plate surface on one side (right plate surface of FIG. 2), out of the left and right plate surfaces of the protrusion body 69. As shown in FIG. 6, the front surface of the sub lock receiving portion 71 is inclined rearward toward a tip side (one end side) in a projecting direction. The rear surface of the sub lock receiving portion 71 is arranged along the lateral direction.

<Mating Terminals>

The mating terminal 80 is made of conductive metal and has an elongated shape as a whole. As shown in FIG. 1, the mating terminal 80 includes a first extending portion 81 extending in the front-rear direction, a second extending portion 82 extending downward from the rear end of the first extending portion 81 and a third extending portion 83 extending rearward from the lower end of the second extending portion 82. The first extending portion 81 is passed through the back wall 63 at an intermediate position in the front-rear direction, and mounted in the receptacle 62. A front part of the first extending portion 81 is arranged to project into the receptacle 62.

As shown in FIG. 2, a plurality of the mating terminals 80 are arranged side by side in the width direction in two upper and lower stages in the back wall 63 of the receptacle 62. The aforementioned protrusion 68 is arranged between the front parts of the first extending portions 81 adjacent in the width direction on a widthwise central side in the receptacle 62. When the housing 11 and the mating housing 61 are connected, the front ends of the first extending portions 81 contact the terminals 50.

As shown in FIG. 1, a rear part of the first extending portion 81, the second extending portion 82 and the third extending portion 83 are arranged to be exposed behind the back wall 63. The third extending portion 83 is arranged along the surface of the circuit board 90 and connected to an unillustrated conductive portion of the circuit board 90 by soldering.

<Housing>

Figure 3:
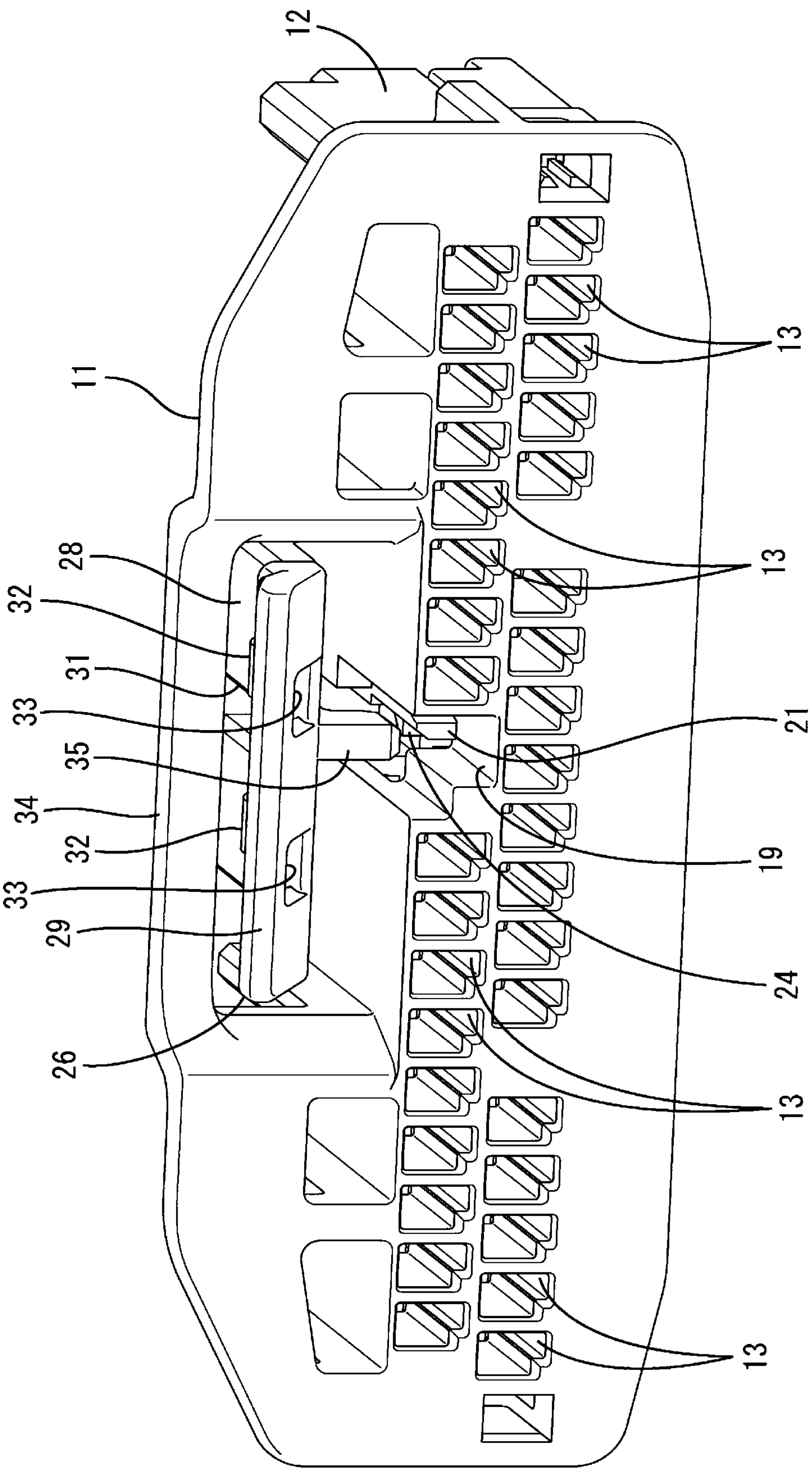
FIG. 3 is a perspective view of the housing viewed from behind.
Figure 4:
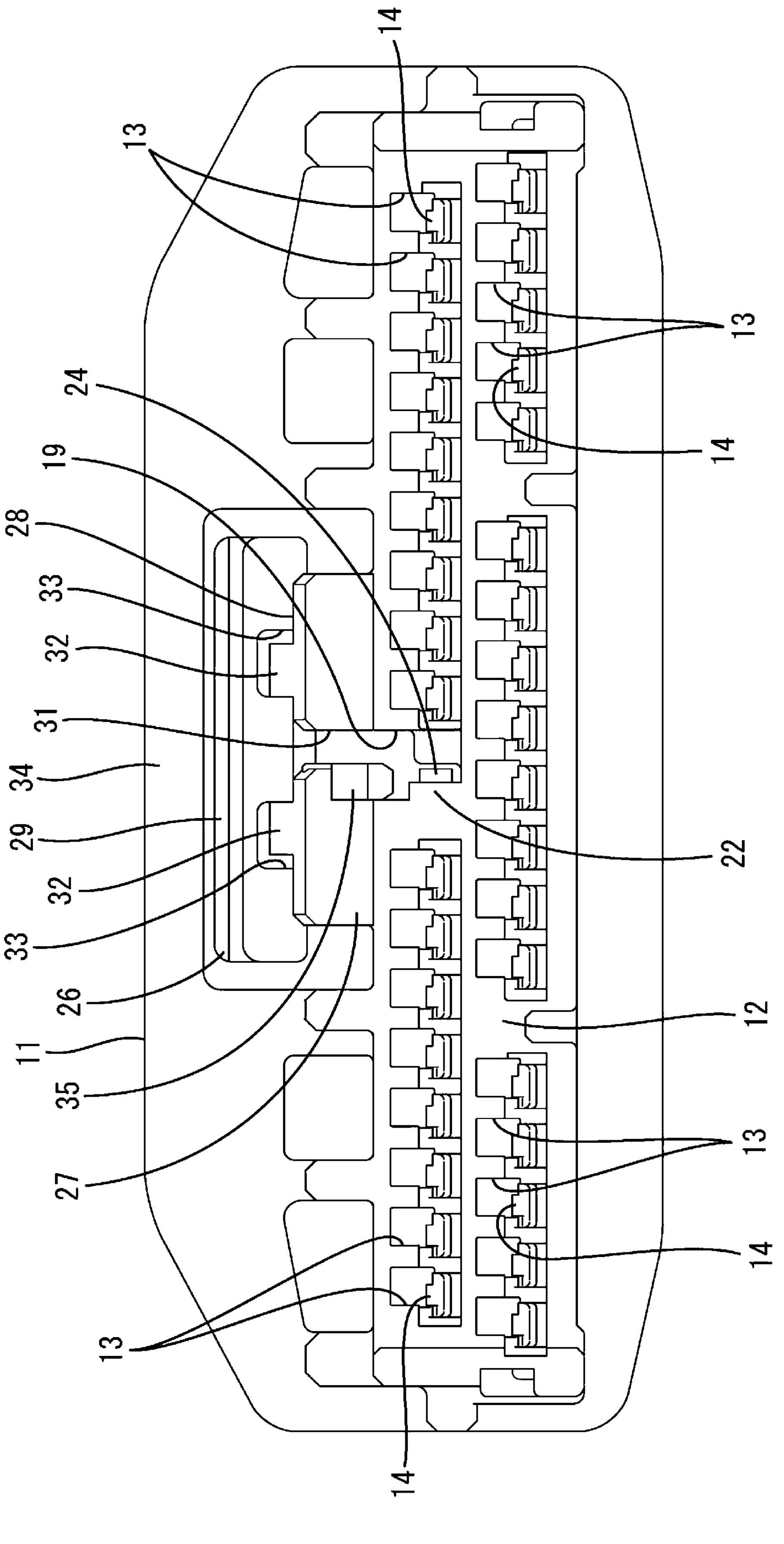
FIG. 4 is a front view of the housing.

The housing 11 is made of synthetic resin and includes a housing body 12 in the form of a block long in the lateral direction. As shown in FIG. 1, the housing body 12 is fit into the receptacle 62 together with a lock arm 26 to be described later. As shown in FIGS. 3 and 4, the housing body 12 includes a plurality of cavities 13. The respective cavities 13 are arranged side by side in the width direction in two upper and lower rows to correspond to the respective mating terminals 80 in the housing body 12. As shown in FIG. 1, the cavities 13 penetrate in the front-rear direction in the housing body 12. The housing body 12 includes deflectable and deformable locking lances 14 projecting into the cavities 13. The terminals 50 are inserted into the cavities 13 from behind. The terminals 50 are locked by the locking lances 14 and primarily restricted from coming out from the cavities 13.

The housing 11 includes a front mask 15 to be mounted on the front surface of the housing body 12. The front mask 15 includes a front wall 16 for covering the respective locking lances 14 from front. The front wall 16 includes tab insertion holes 17 communicating the respective cavities 13. The first extending portion 81 of the mating terminal 80 is inserted through the tab insertion hole 17. Any further movement of the terminal 50 is restricted by the terminal 50 contacting the front wall 16.

The housing 11 includes a retainer mount hole 18 open in the lower surface of the housing body 12. The retainer mount hole 18 communicates the respective cavities 13. A retainer 20 is inserted into the retainer mount hole 18 from below. The retainer 20 secondarily restricts the escape of the terminals 50 from the cavities 13 by contacting the terminals 50.

As shown in FIGS. 3 and 4, the housing body 12 includes a groove-like opening 19 penetrating in the front-rear direction between the cavities 13 in the upper row adjacent in the width direction on a widthwise central side. The opening 19 extends in the vertical direction and is open in the upper surface of the housing body 12.

In the housing body 12, a sub lock portion 21 is provided on a side surface on one side (right side surface of FIG. 3), out of left and right side surfaces of the opening 19. As shown in FIG. 6, the sub lock portion 21 includes a base portion 22 (see FIG. 4) in the form of a rectangular block projecting from a front end lower part of the side surface on the one side of the opening 19, a sub lock body 23 extending rearward from the base portion 22 and a sub lock projection 24 projecting toward the other side from an intermediate position of the sub lock body 23 in an extending direction. The sub lock body 23 is deflectable and deformable in the width direction (lateral direction) with a coupled part to the base portion 22 as a fulcrum. A space for allowing the deflection of the sub lock body 23 is provided between the side surface on the one side of the opening 19 and the sub lock body 23.

Figure 5:
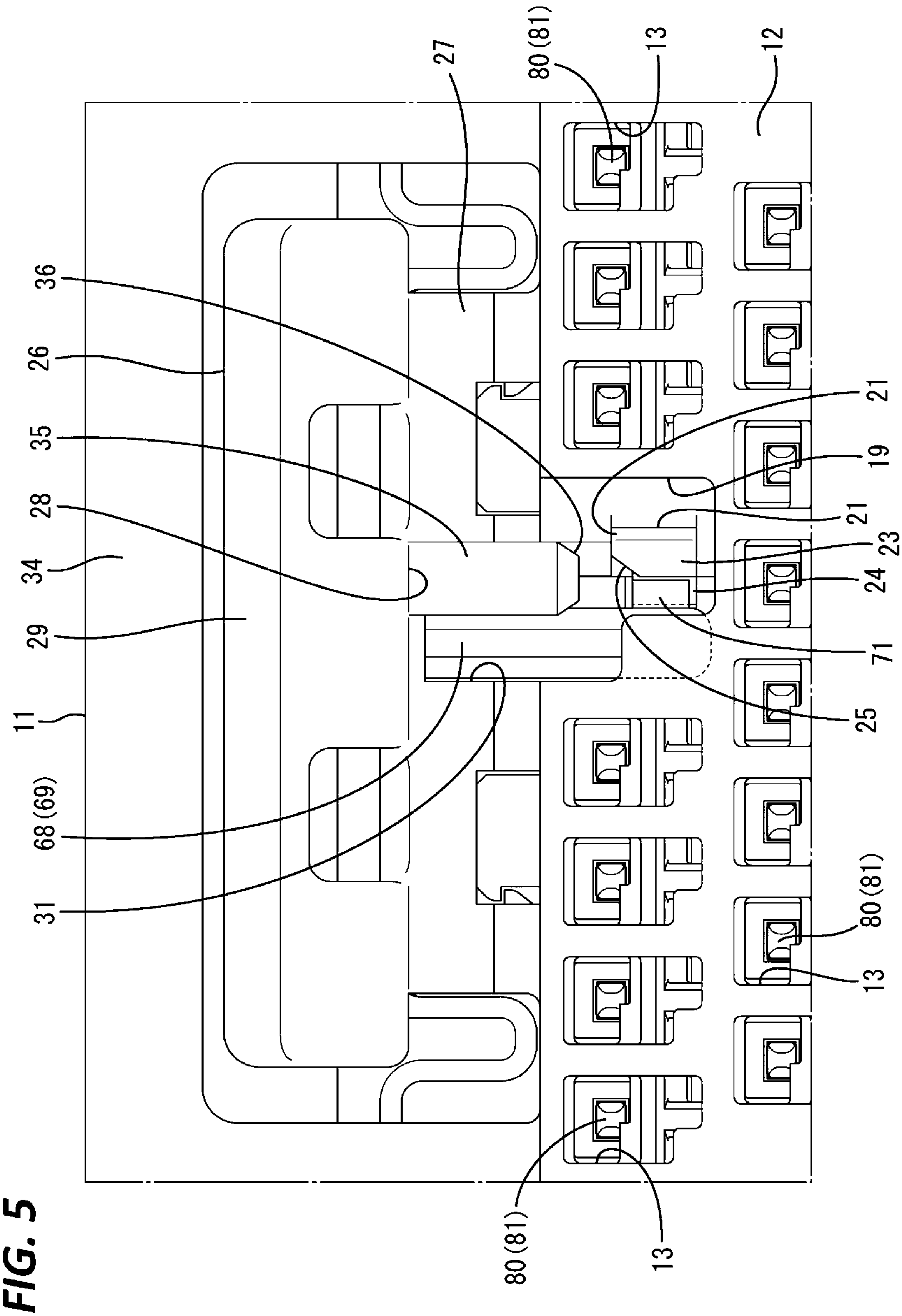
FIG. 5 is a partial enlarged view viewed from behind the housing showing a locked state of a sub lock portion and a sub lock receiving portion with the housing and the mating housing properly connected.
Figure 7:
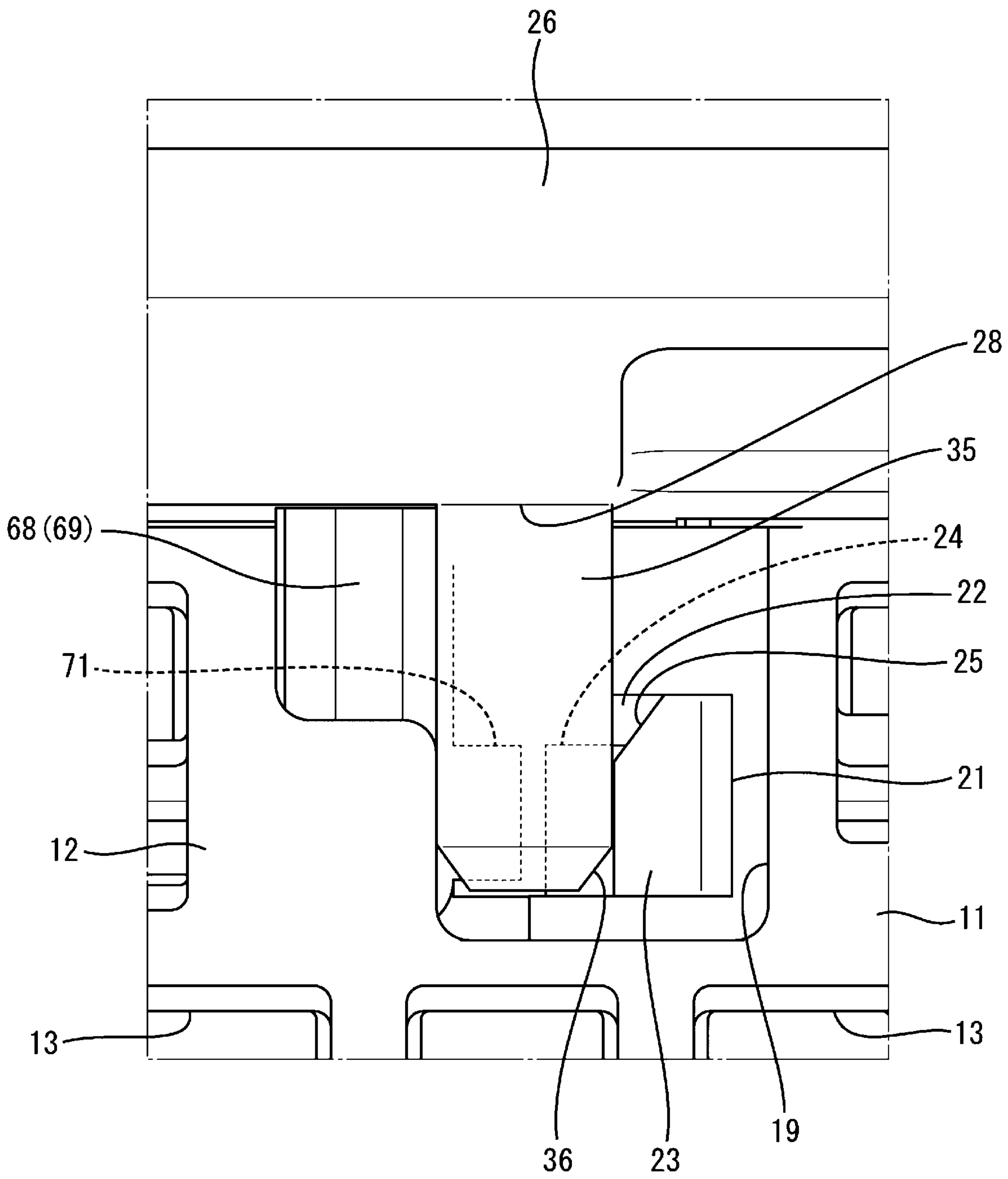
FIG. 7 is a partial enlarged view viewed from behind the housing showing a state where a lock arm is resiliently displaced downward, a releasing portion contacts the sub lock portion and the sub lock portion is resiliently displaced in a lateral direction.

The sub lock body 23 has a cam surface 25 shaped by chamfering a corner part on the other side of the upper surface (corner part on a side opposite to the space) over the entire length in the front-rear direction. As shown in FIGS. 5 and 7, the cam surface 25 is inclined in a direction intersecting the lateral direction and vertical direction. In the case of this embodiment, the cam surface 25 is formed to have a linear cross-section (tapered shape) facing upward toward the other side.

The sub lock projection 24 projects from a lower part of the sub lock body 23. As shown in FIG. 4, when the housing 11 is viewed from front, the sub lock projection 24 lateral to the base portion 22 can be visually confirmed. As shown in FIGS. 6 and 7, the upper end of the sub lock projection 24 is arranged at a height overlapping the cam surface 25. As shown in FIG. 6, the front surface of the sub lock projection 24 is inclined rearward toward a tip side (other end side) in a projecting direction. The rear surface of the sub lock projection 24 is arranged along the lateral direction and vertical direction.

The housing 11 includes the lock arm 26 above the housing body 12. The lock arm 26 includes a base end portion 27 projecting upward from a widthwise central side on the upper surface of the housing body 12, an arm body 28 extending rearward from the base end portion 27 and an operating portion 29 bent and rising from the rear end of the arm body 28 (see FIGS. 1, 3 and 4). The lock arm 26 is deflectable and deformable with the base end portion 27 as a fulcrum.

As shown in FIG. 4, the base end portion 27 is in the form of a wide rectangular block long in the lateral direction. The arm body 28 and the operating portion 29 are in the form of wide plates continuous from the base end portion 27. The lock arm 26 includes a slit-like groove portion 31 extending in the front-rear direction from the base end portion 27 to the arm body 28 on a widthwise central side. The groove portion 31 penetrates through the lock arm 26 in the vertical direction and communicates with the opening 19 on a lower side.

The lock arm 26 includes a pair of lock projections 32 projecting from both side parts across the groove portion 31 on the upper surface of the arm body 28. The respective lock projections 32 are fit into the corresponding lock receiving portions 72 when the housing 11 and the mating housing 61 are connected (see FIG. 1).

As shown in FIG. 3, the operating portion 29 includes a pair of mold removal holes 33 penetrating in the front-rear direction behind the respective lock projections 32. The respective mold removal holes 33 are formed by removing an unillustrated mold used to mold the respective lock projections 32. In separating the housing 11 and the mating housing 61, the operating portion 29 is pressed. A bridge portion 34 for covering an upper side of the operating portion 29 is provided on the upper surface of the housing body 12. Excessive deflection (inversion) of the lock arm 26 is restricted by the contact of the operating portion 29 with the bridge portion 34. An inadvertent pressing operation of the operating portion 29 is restricted by the bridge portion 34.

As shown in FIG. 3, the lock arm 26 includes a releasing portion 35 below the arm body 28. The releasing portion 35 projects downward from a rear end part on one side, out of both sides across the groove portion 31 on the lower surface of the arm body 28. The releasing portion 35 is in the form of a plate having plate surfaces facing in the lateral direction. The lower end of the releasing portion 35 is arranged to face the opening 19. As shown in FIGS. 5 to 7, the lower end of the releasing portion 35 has a slant 36 shaped by chamfering a surrounding corner part over the entire periphery. A part of the slant 36 of the releasing portion 35 facing toward the one side (right side of FIG. 5) is arranged to be able to contact the cam surface 25 of the sub lock body 23 from above.

<Terminals>

The terminal 50 is formed, such as by bending a conductive metal plate. As shown in FIG. 1, the terminal 50 includes a tubular connecting portion 51 and a barrel portion 52 in the form of an open barrel provided behind the connecting portion 51. When the terminal 50 is properly inserted into the cavity 13, the locking lance 14 is locked to the connecting portion 51. Further, the retainer 20 is locked to the rear end of the connecting portion 51. The barrel portion 52 is connected to an end part of a wire 40.

<Connection Structure of Connector Device>

The housing 11 is inserted into the receptacle 62 of the mating housing 61. In an insertion process of the housing 11, the protrusion 68 is inserted into the groove portion 31 of the lock arm 26. The lower part of the protrusion 68 is inserted into the opening 19. The sub lock receiving portion 71 passes through a position proximate to a surface on the other side (lower surface of FIG. 6) of the base portion 22.

In the insertion process of the housing 11, the lock arm 26 is deflected and deformed. Specifically, the respective lock projections 32 interfere with the front end of the upper wall 65 of the receptacle 62 and the arm body 28 is displaced downward. As shown in FIG. 7, if the arm body 28 is displaced downward, the releasing portion 35 is also displaced downward and the lower end thereof enters the opening 19. In this way, the releasing portion 35 contacts the sub lock portion 21 and the slant 36 of the releasing portion 35 contacts the cam surface 25 of the sub lock body 23. The sub lock portion 21 is deflected and deformed toward the one side (right side of FIG. 7) by being pressed by the releasing portion 35 via the cam surface 25. The sub lock projection 24 is displaced toward the one side and arranged to hide behind the base portion 22.

With the sub lock portion 21 deflected and deformed toward the one side, the sub lock receiving portion 71 reaches a position corresponding to the sub lock projection 24. Since the sub lock projection 24 is retracted toward the one side as described above, the sub lock receiving portion 71 can pass without interfering with the sub lock projection 24. Thus, in the process of connecting the housing 11 and the mating housing 61, resistance caused by the interference of the sub lock receiving portion 71 and the sub lock projection 24 is not generated.

When the housing 11 is properly inserted into the receptacle 62, the arm body 28 is displaced in a return direction and the lock projections 32 are fit into the lock receiving portions 72 as shown in FIG. 1. As the arm body 28 is displaced in the return direction, the releasing portion 35 comes out from the opening 19, a pressed state thereof toward the sub lock portion 21 is released and the sub lock body 23 is displaced in a return direction. The sub lock projection 24 returns to an initial natural state position. Then, as shown in FIG. 6, the rear surface (rear surface when viewed from the side of the mating housing 61) of the sub lock receiving portion 71 faces the rear surface (rear surface when viewed from the side of the mating housing 61) of the sub lock projection 24 and the sub lock projection 24 and the sub lock receiving portion 71 are arranged to be lockable to each other.

When the housing 11 and the mating housing 61 are properly connected in this way, the locking of the lock arm 26 and the lock receiving portions 72 and the locking of the sub lock portion 21 and the sub lock receiving portion 71 are realized, whereby double locking is applied. Thus, the housing 11 and the mating housing 61 are satisfactorily held in the connected state. Further, the terminals 50 and the mating terminals 80 are also properly connected.

In separating the housing 11 and the mating housing 61 for maintenance or other reason, the operating portion 29 is pressed from above. Then, the arm body 28 is displaced downward and the respective lock projections 32 come out from the corresponding lock receiving portions 72. Further, if the arm body 28 is displaced downward, the releasing portion 35 is also displaced downward. In this way, as shown in FIG. 7, the lower end of the releasing portion 35 enters the opening 19 again. When the slant 36 of the releasing portion 35 contacts the cam surface 25 of the sub lock portion 21, the sub lock portion 21 is deflected and deformed toward the one side (right side of FIG. 7) and the sub lock projection 24 is also displaced toward the one side to release the locking of the sub lock projection 24 and the sub lock receiving portion 71. In this way, the locking of the lock arm 26 and the lock receiving portions 72 and the locking of the sub lock portion 21 and the sub lock receiving portion 71 are simultaneously released by one pressing operation of the operating portion 29. If the housing 11 is pulled out from the receptacle 62 with the operating portion 29 pressed, the housing 11 and the mating housing 61 are separated from each other.

As described above, since double locking can be applied to the mating housing 61 by the lock arm 26 and the sub lock portion 21 according to this embodiment, the connected state of the housing 11 and the mating housing 61 can be satisfactorily held.

Further, since the sub lock portion 21 is arranged in the space below the lock arm 26, which could be a dead space serving as a deflection space for the lock arm 26, in the housing body 12, space saving is realized and the enlargement of the connector 10 can be avoided.

Particularly, the sub lock portion 21 is provided in the opening 19 of the housing body 12 and the opening 19 is arranged side by side with the respective cavities 13 in the upper stage in the width direction. Thus, it is possible to avoid the enlargement of the housing body 12 in the height direction (vertical direction) due to the sub lock portion 21. Moreover, since the sub lock portion 21 is deflectable and deformable in the width direction (lateral direction), which is a direction intersecting a deflecting direction of the lock arm 26, a height increase of the housing body 12 can be more satisfactorily suppressed.

Further, since the lock arm 26 includes the releasing portion 35 projecting downward to release the locking of the sub lock portion 21 and the sub lock receiving portion 71, the lock arm 26 is deflected and deformed downward, thereby automatically releasing the locking of the sub lock portion 21 and the sub lock receiving portion 71. Thus, a special operation for releasing the locking of the sub lock portion 21 and the sub lock receiving portion 71 needs not be performed and releasing workability is excellent. Further, since the sub lock portion 21 is arranged at a back side position in the opening 19 of the housing body 12, hands and interfering objects (external matters) are unlikely to contact the sub lock portion 21 and a situation where the locking of the sub lock portion 21 and the sub lock receiving portion 71 is unintendedly released can be prevented.

Further, in the case of this embodiment, the locked state of the sub lock portion 21 to the mating housing 61 can be visually confirmed through the opening 19 from behind the housing 11 (from the back side viewed from the side of the housing 11) as shown in FIG. 5. Thus, it can be confirmed from behind that the locking of the lock arm 26 and the lock receiving portions 72 and the locking of the sub lock portion 21 and the sub lock receiving portion 71 are established.

Further, since the lock receiving portions 72 are provided in a thickness range of the upper wall 65 of the receptacle 62, it is possible to avoid the enlargement of the receptacle 62 due to the presence of the lock receiving portions 72. Particularly, since the protrusion 68 is arranged side by side with the respective mating terminals 80 in the upper stage in the width direction in the receptacle 62, it is possible to avoid the enlargement of the receptacle 62 in the height direction due to the presence of the protrusion 68 and, consequently, the lock receiving portions 72.

Other Embodiments of Present Disclosure

The embodiment disclosed this time should be considered illustrative in all aspects, rather than restrictive.

Although the sub lock portion is shaped to be deflectable and deformable in the case of the above embodiment, a sub lock portion may be shaped not to be deflected or deformed according to another embodiment. If the sub lock portion is shaped not to be deflected or deformed, a sub lock receiving portion may be shaped to be deflectable and deformable.

Although the sub lock receiving portion is structured to be able to avoid interference with the sub lock projection in the process of connecting the housing and the mating housing in the case of the above embodiment, a sub lock receiving portion may be structured to interfere with a sub lock projection in the process of connecting a housing and a mating housing according to another embodiment.

Although the releasing portion contacts the sub lock portion to release the locking of the sub lock portion and the sub lock receiving portion in the case of the above embodiment, a releasing portion may contact a sub lock receiving portion to release the locking of a sub lock portion and the sub lock receiving portion according to another embodiment.

Although the cam surface is provided only on the sub lock portion in the case of the above embodiment, cam surfaces may be provided on both a releasing portion and a sub lock portion or a cam surface may be provided only on a releasing portion according to another embodiment.

Although the lock receiving portion is provided to penetrate through the peripheral wall (upper wall) of the receptacle in the thickness direction in the case of the above embodiment, a lock receiving portion may be shaped into a bottomed recess recessed in the inner surface of a peripheral wall (upper wall) of a receptacle according to another embodiment.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A connector, comprising:
a housing body;
a lock arm shaped to project from the housing body and be deflectable and deformable; and
a sub lock portion arranged at a position facing the lock arm in a deflecting direction of the lock arm in the housing body,
wherein:
the lock arm and the sub lock portion lock a mating housing to hold the housing body and the mating housing in a connected state,
the lock arm includes a releasing portion projecting in the deflecting direction and configured to release locking of the sub lock portion to the mating housing, and
the sub lock portion is deflected and deformed in a direction intersecting the deflecting direction of the lock arm by being pressed by the releasing portion when the lock arm is deflected and deformed and the releasing portion contacts the sub lock portion.

2. The connector of claim 1, wherein at least one of the releasing portion and the sub lock portion has a cam surface inclined in a direction intersecting the deflecting direction of the lock arm and configured to contact the other of the releasing portion and the sub lock portion.

3. The connector of claim 1, wherein the housing body includes an opening open in a rear surface on a side opposite to a side facing the mating housing and enabling visual confirmation of a locked state of the sub lock portion to the mating housing.

4. A connector device, comprising:
the connector of claim 1; and
a mating connector including the mating housing,
wherein:
the mating housing includes a lock receiving portion to be locked to the lock arm, a sub lock receiving portion to be locked to the sub lock portion and a receptacle into which a plurality of mating terminals project, and
the lock receiving portion is shaped to penetrate through or be recessed in a peripheral wall of the receptacle.

5. The connector device of claim 4, wherein:
the mating housing includes a protrusion projecting into the receptacle and arranged between the plurality of mating terminals, and
the sub lock receiving portion is provided on the protrusion.

* * * * *